United States Patent
Ling

(10) Patent No.: US 11,754,162 B2
(45) Date of Patent: Sep. 12, 2023

(54) DOUBLE-FLEXSPLINE HARMONIC REDUCER

(71) Applicant: AICI TECHNOLOGY (SHENZHEN) CO. LTD., Guangdong (CN)

(72) Inventor: Zilong Ling, Guangdong (CN)

(73) Assignee: AICI TECHNOLOGY (NINGBO) CO., LTD., Ningbo (CN)

( * ) Notice: Subject to any disclaimer, the term of this patent is extended or adjusted under 35 U.S.C. 154(b) by 95 days.

(21) Appl. No.: 17/281,928

(22) PCT Filed: Sep. 28, 2019

(86) PCT No.: PCT/CN2019/108807
§ 371 (c)(1),
(2) Date: Mar. 31, 2021

(87) PCT Pub. No.: WO2020/069660
PCT Pub. Date: Apr. 9, 2020

(65) Prior Publication Data
US 2021/0381588 A1    Dec. 9, 2021

(30) Foreign Application Priority Data

Oct. 3, 2018 (CN) .......................... 201811163988.8

(51) Int. Cl.
F16H 49/00    (2006.01)
F16H 55/08    (2006.01)
F16H 55/17    (2006.01)

(52) U.S. Cl.
CPC ....... *F16H 49/001* (2013.01); *F16H 55/0833* (2013.01); *F16H 55/17* (2013.01); *F16H 2049/003* (2013.01); *F16H 2055/176* (2013.01)

(58) Field of Classification Search
CPC .................................................. F16H 49/001
(Continued)

(56) References Cited

U.S. PATENT DOCUMENTS 3,555,929 A * 1/1971 Hossfelf ............... F16H 49/001
                                                          74/640
4,909,098 A * 3/1990 Kiryu ................... F16H 49/001
                                                          384/532
(Continued)

FOREIGN PATENT DOCUMENTS

CN    102734394 A    10/2012
CN    206072245 U    4/2017
CN    109139855 A    1/2019

OTHER PUBLICATIONS

International Search Report of PCT/CN2019/108807.
Written Opinion of PCT/CN2019/108807.

*Primary Examiner* — Ha Dinh Ho
(74) *Attorney, Agent, or Firm* — Dragon Sun Law Firm, PC; Nathaniel Perkins

(57) ABSTRACT

Provided is a double-flexspline harmonic reducer, comprising a strong flexspline (3), a weak flexspline (2) and a wave generator (1). The strong flexspline (3) and the weak flexspline (2) are coaxially fixed in an axial direction and a radial direction, and teeth which can be engaged with each other and are different in the number thereof are provided on the strong flexspline (3) and the weak flexspline (2) respectively. The wave generator (1) causes the weak flexspline (2) to undergo non-circular elastic deformation and then to partially engage with the strong flexspline (3), and a contact portion of the strong flexspline (3) and the weak flexspline (2) undergoes non-circular elastic deformation under a radial pressure from the weak flexspline (2). A wall thickness of the strong flexspline (3) is greater than or equal to 2 times and less than 5 times that of the weak flexspline (2).

15 Claims, 24 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 5,456,139 | A | 10/1995 | Aubin | |
| 5,775,178 | A * | 7/1998 | Asawa | F16H 49/001 74/640 |
| 8,991,282 | B2 * | 3/2015 | Yajima | F16H 49/001 74/640 |
| 9,989,141 | B2 * | 6/2018 | Miyake | F16H 49/001 |
| 10,077,829 | B2 * | 9/2018 | Kliber | F16H 49/001 |
| 10,236,747 | B2 * | 3/2019 | Terashima | H02K 5/207 |
| 10,508,729 | B2 * | 12/2019 | Kobayashi | F16H 49/001 |
| 10,890,239 | B2 * | 1/2021 | Takizawa | F16H 49/001 |
| 2006/0213294 | A1 | 9/2006 | Osle | |

* cited by examiner

DOUBLE-FLEXSPLINE HARMONIC REDUCER

CROSS-REFERENCE TO RELATED APPLICATIONS

This application is a national stage application of PCT/CN2019/108807. This application claims priorities from PCT Application No. PCT/CN2019/108807, filed Sep. 28, 2019, and from the Chinese patent application 201811163988.8 filed Oct. 3, 2018, the content of which are incorporated herein in the entirety by reference.

TECHNICAL FIELD

The present invention relates to the field of reducers, in particular to a double-flexspline harmonic reducer.

BACKGROUND OF THE PRESENT INVENTION

Harmonic gear drive was invented by American inventor C. W. Musser in 1955. It is a novel drive mode of motion or power transmission by taking advantage of the elastic deformation of flexible operating members, which breaks away from the mechanical drive mode using a rigid member mechanism but using a flexible member instead, thus achieving a series of special functions that are difficult to be achieved by other drives. It is so named because the deformation process of an intermediate flexible member is essentially a symmetrical harmonic wave. This drive is called "harmonic drive" in the United States, Britain, Germany, Japan and other countries in addition to being called wave drive or flexspline drive in the former Soviet Union.

The deceleration principle of a harmonic gear drive is to achieve motion and power transmission by the relative motion of a flexspline, a circular spline and a wave generator, mainly the controllable elastic deformation of the flexspline. An elliptical cam in the wave generator rotates in the flexspline, causing the flexspline to deform. When teeth of the flexspline and the circular spline at both ends of a major axis of the elliptical cam of the wave generator are engaged with each other, those at both ends of a minor axis thereof are disengaged from each other. The teeth between the major axis and the minor axis of the wave generator are in a semi-engaged state of gradually engaging at different sections along the circumference of the flexspline and the circular spline, which is called engaging-in, and in a semi-engaged state of gradually disengaging, which is called engaging-out. When the wave generator rotates continuously, the flexspline deforms constantly, so that the teeth of the two splines constantly change their original operating states, i.e., engaging, engaging-in, engaging-out and disengaging, resulting in a staggered tooth motion and thus realizing active motion transmission from the wave generator to the flexspline.

An existing harmonic gear drive consists of: ① a circular spline which is an internal circular spline usually having two more teeth than those of a flexspline and fixed on a casing; ② the flexspline which is a thin cup-shaped metal elastic member having gears on an outer ring of an opening, deforms with the rotation of a wave generator and is usually coupled to an output shaft; and ③ the wave generator which consists of an elliptical cam and a flexible bearing and is usually coupled to an input shaft. An inner race of the flexible bearing is fixed on the cam, while an outer race thereof may elastically deform into an ellipse through balls.

SUMMARY OF THE PRESENT INVENTION

Technical Problem

However, at present, the backlash of a harmonic reducer depends on whether teeth of an elliptical major axis after the elliptical deformation of the flexspline under the action of the wave generator are closely engaged with those of the circular spline or not; if not, the backlash will be larger, and if so, engagement interference will result in failure to assemble or difficult rotation. The accurate engagement between the flexspline and the circular spline depends on the manufacturing accuracy of the harmonic reducer, but the higher accuracy requirement will increase the manufacturing cost and limit the use of certain cheaper materials and machining processes. At the same time, the flexspline, the circular spline and the wave generator will wear to a certain extent during operation, which will cause poorer and poorer engagement between the flexspline and the circular spline and gradual increase in the backlash of the reducer, thus making the accuracy life of the reducer not too long.

Technical Solution

In order to solve the above problems, the present invention provides a double-flexspline harmonic reducer.

A technical solution employed by the present invention is as follows.

A double-flexspline harmonic reducer is provided, including a strong flexspline, a weak flexspline and a wave generator. The strong flexspline and the weak flexspline are coaxially fixed in an axial direction and a radial direction, and teeth which can be engaged with each other and are different in the number thereof are provided on the strong flexspline and the weak flexspline respectively; the wave generator causes the weak flexspline to undergo non-circular elastic deformation and then to partially engage with the strong flexspline, and a contact portion of the strong flexspline and the weak flexspline undergoes non-circular elastic deformation under a radial pressure from the weak flexspline. The double-flexspline harmonic reducer is to replace a circular spline of existing harmonic reducers with one strong flexspline whose rigidity is greater than that of the flexspline of existing harmonic reducers, so one of the distinctive features that distinguishes the strong flexspline from existing circular splines is that the strong flexspline has a flexible thin wall similar to that of the flexspline of the existing harmonic reducer, i.e., the strong flexspline includes a thin-wall structure which can elastically deform between a tooth ring structure capable of elastically deforming and a connecting flange structure incapable of elastically deforming, and such structure which can facilitate the non-circular elastic deformation of a surface of the tooth ring structure is generally a thin-wall tubular structure. Another distinctive feature of the double-flexspline harmonic reducer is that a reference radius of the tooth farthest from an axis of the reducer after non-circular deformation of the weak flexspline under the action of the wave generator is greater than that of a circular tooth ring before the assembly of the strong flexspline. The weak flexspline undergoes non-circular elastic deformation under the action of the wave generator, and the strong flexspline undergoes non-circular elastic deformation under a radial pressure from teeth of an engaged portion after non-circular deformation of the weak flexspline. The weak flexspline always keeps part of the teeth thereof continuously engaged in and out the teeth of the strong flexspline along a rotation direction of the wave generator. Because of a difference in the number of teeth between the strong flexspline and the weak flexspline, the strong flexspline and the weak flexspline will rotate relatively when driven by the rotation of the wave generator, to achieve a reducer effect of reducing speed and increasing torque. An shaft hole or a flange connected to an input power source is provided on the wave generator, and a fixed flange and an output flange are arranged on the strong flexspline and the weak flexspline, respectively. Of course, the double-flexspline harmonic reducer further has the same reversible output characteristics as the existing harmonic reducers. In practice, most of the wave generators adopt an elliptical cam having a rolling bearing on an outer ring thereof, and the elliptical cam belongs to double-end cams that can cause two teeth of the weak flexspline to engage with the strong flexspline. The difference in the number of teeth between the strong flexspline and the weak flexspline should be an integral multiple of the number of cam ends of the wave generator. Theoretically, single-end cams or multi-end cams having more than three ends may also be adopted to cause the weak flexspline to engage with the strong flexspline at one or more places, and cams different in the number of ends have corresponding requirements on the number and profile of teeth of the strong flexspline and the weak flexspline. The strong flexspline and weak flexspline may use cycloid teeth, involute teeth, triangular teeth, trapezoidal teeth, circular cycloid teeth and the like. Since the strong flexspline may have a certain amount of deformation, it is possible to set a tooth surface engaging pressure within a certain controllable range, and the engagement is improved accordingly, which can facilitate the use of teeth of a smaller height. The use of smaller tooth heights helps to reduce the elastic deformation of the weak flexspline and thus slow down material fatigue, and also to miniaturize the reducer. The purpose of using double flexsplines is to allow the strong flexspline to have a small or trace amount of non-circular elastic deformation along with the weak flexspline during the operation of the harmonic reducer. In this way, it can enhance the tolerance of the harmonic reducer to parts, and also can improve the wear resistance of the harmonic reducer to prolong the accuracy life of the reducer. Therefore, it is allowed to use cheaper materials and machining processes to manufacture the harmonic reducer with better manufacturing accuracy, thus significantly reducing the cost of the harmonic reducer. A wall thickness of the strong flexspline is greater than or equal to 2 times and less than 5 times that of the weak flexspline. The wall thickness of the strong flexspline or the wall thickness of the weak flexspline refers to a wall thickness of a tubular part of the flexspline that mainly undergoes flexible non-circular deformation, and the above limits are mainly based on the premise that the strong flexspline and the weak flexspline are generally made of materials with similar or identical modulus of elasticity, and if the strong flexspline and the weak flexspline are made of materials with a large difference in modulus of elasticity, the above wall thickness limits should be converted based on the difference in modulus of elasticity of the materials.

In the double-flexspline harmonic reducer, the strong flexspline includes a thin-wall structure which can elastically deform between a tooth ring structure and a connecting flange structure. The strong flexspline has a flexible thin wall similar to that of the flexspline of the existing harmonic reducer, i.e., the strong flexspline includes a thin-wall structure which can elastically deform between a tooth ring structure capable of elastically deforming and a connecting flange structure incapable of elastically deforming, and such structure which can facilitate the non-circular elastic deformation of a surface of the tooth ring structure is generally a thin-wall tubular structure.

In the double-flexspline harmonic reducer, a reference radius of the tooth farthest from an axis of the reducer after non-circular deformation of the weak flexspline under the action of the wave generator is greater than that of a circular tooth ring before the assembly of the strong flexspline. The difference can ensure that the strong flexspline will elastically deform to a certain extent after assembly, and is also the amount of elastic deformation of the strong flexspline. Only on the basic premise of keeping a certain amount of elastic deformation can the strong flexspline achieve the technical effect of the present invention. The above radius relation is based on the fact that the weak flexspline is arranged inside and the strong flexspline is arranged outside. In this case, the weak flexspline is provided with an external tooth ring, and the strong flexspline is provided with an internal tooth ring, and the wave generator acts on an inner wall of the weak flexspline.

The reference radius of the circular tooth ring before the assembly of the strong flexspline is greater than that of the tooth closest to the axis of the reducer after non-circular deformation of the weak flexspline under the action of the wave generator. Theoretically, there is another harmonic reducer structure in which the weak flexspline is provided with an internal tooth ring and the strong flexspline is provided with an external tooth ring, and the wave generator acts on an outer wall of the weak flexspline, which means that the weak flexspline extrudes the strong flexspline inward. Such a structure requires the reference radius of the circular tooth ring before the assembly of the strong flexspline to be greater than that of the tooth closest to the axis of the reducer after non-circular deformation of the weak flexspline under the action of the wave generator. It is generally recommended that the difference is at least 0.05 mm or more, and even required to be 0.1 mm or 1 mm or more in some cases. The difference is the amount of flexible deformation of the assembled strong flexspline, which is related to the radius, material and machining accuracy of the strong flexspline. The larger the radius, the larger the designed amount of deformation of the strong flexspline should theoretically be; the softer the material, the larger the designed amount of deformation should theoretically be; and the lower the machining accuracy requirement, the larger the designed amount of deformation should theoretically be. In case of a wave generator with an elliptical hole, the above amount of deformation is the difference between the radius of the elliptical major axis and the radius of the elliptical minor axis after the elliptical deformation of the strong flexspline.

The double-flexspline harmonic reducer further includes a reducer main bearing through which the strong flexspline and the weak flexspline are coaxially fixed in an axial direction and a radial direction. As being required to bear the axial moment, radial moment and overturning moment, the reducer main bearing may generally be a crossed roller bearing or double-row angular contact bearing, and may also be a pair of angular contact bearings or a pair of tapered roller bearings installed separately. In a specific structure of the reducer, the main bearing may be any bearing or bearing assembly which can also bear the axial moment, radial moment and overturning moment. Moreover, an inner race and an outer race of the reducer main bearing may be machined in whole or in part directly on the strong flexspline and the weak flexspline, and may also be fixed to the strong flexspline and the weak flexspline by bolts. The output flange and fixed flange of the double-flexspline harmonic reducer may be machined on the strong flexspline and the weak flexspline, respectively, and may also be machined on the inner race and the outer race of the reducer main bearing, respectively. In some special cases, the reducer main bearing may be a sliding bearing, and even the inner race and outer race of the sliding bearing may be machined in whole or in part directly on the strong flexspline and the weak flexspline, respectively.

The double-flexspline harmonic reducer further includes a wave generator locating bearing through which the wave generator is fixed in an axial direction and a radial direction to the strong flexspline or the weak flexspline. Because there is no circular spline of the existing harmonic reducers, better fixing the axis of the wave generator to make it coaxial with the strong flexspline or the weak flexspline may effectively reduce the influence of slight disalignment occurred when the wave generator is connected to a motor on the service life and drive efficiency of the reducer. The above wave generator locating bearing, which is a circular bearing provided additionally, shall not be confused with a non-circular bearing used in the wave generator of existing harmonic reducers. If a drive shaft of the wave generator such as a motor shaft and the reducer main bearing are well fixed coaxially in a radial direction in an actual structure, the wave generator locating bearing may be eliminated. In this case, the wave generator is fixed concentrically and radially to the strong flexspline and the weak flexspline through an input drive shaft.

The reference radius of the tooth farthest from the axis of the reducer after non-circular deformation of the weak flexspline under the action of the wave generator is over 0.05 mm greater than that of the circular tooth ring before the assembly of the strong flexspline.

The reference radius of the tooth farthest from the axis of the reducer after non-circular deformation of the weak flexspline under the action of the wave generator is over 0.2 mm greater than that of the circular tooth ring before the assembly of the strong flexspline.

The reference radius of the tooth farthest from the axis of the reducer after non-circular deformation of the weak flexspline under the action of the wave generator is over 1 mm greater than that of the circular tooth ring before the assembly of the strong flexspline. The difference is the amount of flexible deformation of the assembled strong flexspline, which is related to the radius, material and machining accuracy of the strong flexspline. The larger the radius, the larger the designed amount of deformation of the strong flexspline should theoretically be; the softer the material, the larger the designed amount of deformation should theoretically be; and the lower the machining accuracy requirement, the larger the designed amount of deformation should theoretically be. In case of an elliptical wave generator, the above amount of deformation is the difference between the radius of the elliptical major axis and the radius of the elliptical minor axis after the elliptical deformation of the strong flexspline.

The strong flexspline is a tubular elastic part with an inward or outward flanging. The flanging is machined with part of the inner race or outer race of the reducer main bearing, or machined with screw holes so as to be fixed to the inner race or outer race of the reducer main bearing by bolts, and the inward flanging is also commonly referred to as a cup-shaped flanging.

The weak flexspline is a thin-wall tubular elastic part with an inward or outward flanging. The flanging is machined with part of the inner race or outer race of the main bearing of the reducer, or machined with screw holes so as to be fixed to the inner race or outer race of the main bearing of the reducer by bolts, and the inward flanging is also commonly referred to as a cup-shaped flanging.

Usually, existing harmonic reducers are of a structure in which the flexspline is arranged inside and the circular spline is arranged outside. In this case, external teeth are machined on the flexspline and internal teeth are machined on the circular spline. However, it is theoretically feasible that the flexspline is arranged outside and the circular spline is arranged inside. In this case, internal teeth are machined on the flexspline and external teeth are machined on the circular spline, and the flexspline is extruded inward by an inner race of the non-circular bearing of the wave generator to engage with the circular spline at the same time, which is more conducive to the structural form of harmonic reducers of a hollow structure. Of course, for a better hollow structure, the rotation of the wave generator may be driven by an outer rotor motor of the same hollow structure or by a gear or synchronous belt on the outer ring of the wave generator. Similarly, the double-flexspline harmonic reducer usually adopts a structural form with the strong flexspline outside and the weak flexspline inside. At this time, external teeth are machined on the weak flexspline and internal teeth are machined on the strong flexspline. However, theoretically, it is also possible to adopt a structure in which the strong flexspline with external teeth is arranged inside and the weak flexspline with internal teeth is arranged outside, so that the weak flexspline may be in a tubular shape having an outward flanging while the strong flexspline is in a tubular shape having an inward flanging. At the same time, the wave generator is of a hollow structure, the weak flexspline is extruded inward by the inner race of the non-circular bearing of the wave generator to undergo non-circular deformation, and the strong flexspline is further extruded by the weak flexspline to undergo a small amount of non-circular deformation. In this case, the rotation of the wave generator may be driven by an outer rotor motor of the same hollow structure or by the gear or synchronous belt on the outer ring of the wave generator.

The double-flexspline harmonic reducer further includes an outer flexspline protective casing fixed to the inner race or the outer race of the reducer main bearing. The strong flexspline and the weak flexspline are both flexible and can be collectively referred to as flexspline. Since it is not the circular spline but the flexspline arranged on an outer side the reducer, it is very important to protect the flexspline on the outer side of the reducer to ensure that the outer flexspline is not damaged during transportation and installation and that there is enough space reserved for deformation of the outer flexspline during installation of the reducer, so the flexspline protective casing can provide effective protection. At the same time, the flexspline protective casing may serve as a coaxial fixed connector between the reducer main bearing and the wave generator locating bearing, and the wave generator locating bearing is fixed coaxially to the reducer main bearing through the flexspline protective casing.

The strong flexspline or the weak flexspline of the double-flexspline harmonic reducer is made of a plastic material through injection molding, or made of the plastic material through injection molding and then minimally machined. The accuracy of the injection molding process is lower than that of the precision metal machining process, and plastic parts have the shortcomings of water absorption and thermal deformation, so it is difficult for the existing harmonic reducer structure to achieve a high drive efficiency with minimal backlash if the flexspline is machined through the injection molding process. When the structure of double-flexspline harmonic reducer is adopted, a precision harmonic drive may be realized as long as the tolerance of the injection molding is less than a preset amount of elastic deformation of the strong flexspline. POM materials and nylon materials are both potentially suitable for being molded into flexsplines through injection. For example, PA66, PA6, PA601 and other nylon materials are very suitable for being directly molded through injection or minimally machined after injection molding into the flexspline parts in the technical solution of the present invention. With the development of polymer injection materials, new composite polymer materials are constantly being developed. As long as the hardness, wear resistance, toughness and fatigue resistance thereof meet the requirements, polymer injection materials can be molded through injection into the flexspline parts of the double-flexspline harmonic reducer, which can significantly reduce the cost and weight of precision reducers.

The weak flexspline and the strong flexspline of the double-flexspline harmonic reducer are directly molded through injection into parts including part of the inner race and outer race of the main bearing, respectively. Because of the convenience of injection molding, part of the inner race or outer race of the main bearing is directly injected in one piece on the weak flexspline and the strong flexspline parts, to simplify the structure and reduce the cost. Of course, the machining process of the parts may include injection molding and then minimal post-machining.

A ball rolling groove of the wave generator is directly molded by machining on the flexspline of the double-flexspline harmonic reducer. When the plastic material is molded through injection into the weak flexspline, the wave generator may also be molded through injection, and rolling elements of the bearing are filled during assembly between the bearing inner race and the bearing outer race which are machined on the wave generator and the weak flexspline respectively, especially when a full ball bearing is formed by filling full balls, it is more conducive to simplify the structure and reduce costs.

The teeth of the double-flexspline harmonic reducer may be machined by laser engraving or etching. It is not easy for the existing harmonic reducers to use very small teeth due to the limitation of tolerance, but the double-flexspline harmonic reducer of the present invention can use very small teeth because of its good fault tolerance, so that the harmonic reducer may be designed in such a way that the weak flexspline can operate with only a small amount of non-circular deformation, which can effectively prolong the service life of the weak flexspline and also reduce the heat generation and improve the drive efficiency. Therefore, it can be considered to machine the teeth of the strong flexspline and the weak flexspline by laser engraving or etching to improve the machining efficiency and reduce the machining cost.

The above strong flexspline and weak flexspline both belong to flexsplines although being different in strength, and are familiar to those of ordinary skill in the field of harmonic reducers and those of ordinary skill in the technical field of drives, like the wave generator, the bearing and other components, so the detailed technical specifications, machining process and common materials thereof will not be described in detail herein. As for common structures of the double-flexspline harmonic reducer, embodiments for several typical structures are also given below in the present patent. It is believed that those of skill in the art can understand that the present invention can be applied to all structures of existing harmonic reducers after understanding the characteristic feature of the present invention, that is, a harmonic reducer replacing the circular spline of existing harmonic reducers with the flexspline with a strong modulus of elasticity.

Beneficial Effects

A remarkable advantage of the double-flexspline harmonic reducer is that it is more tolerant to machining tolerance, and is a precision harmonic reducer that can use parts with lower tolerance requirements to realize high precision and small or even zero backlash. At the same time, the tolerance to parts is equal to the tolerance to parts wear. Parts wear in a certain range will not affect the precision of the reducer, which can effectively prolong the service life of the reducer. Since the requirements for machining tolerances of parts are reduced, the selection range of materials and machining processes is expanded a lot, which means that the precision harmonic reducer may be realized with cheaper materials and machining processes, thereby reducing the cost of the harmonic reducer at the same degree of precision. For example, if it is more tolerant to wear, the requirements for heat treatment processes of the flexsplines of the existing harmonic reducers may be reduced or omitted, because the heat treatment of the flexsplines will reduce the fatigue life of the flexspline materials resisting elastic deformation. The double-flexspline reducer is also conducive to the use of teeth of smaller heights, which can help to reduce the elastic deformation of the weak flexspline and thus slow down material fatigue, and also to miniaturize the reducer.

In which:

| 1: wave generator; | 2: weak flexspline; |
| 3: strong flexspline; | 4: reducer main bearing; |
| 5: wave generator locating bearing; | 6: flexspline protective casing. |

DETAILED DESCRIPTION OF THE PRESENT INVENTION

Figure 1:
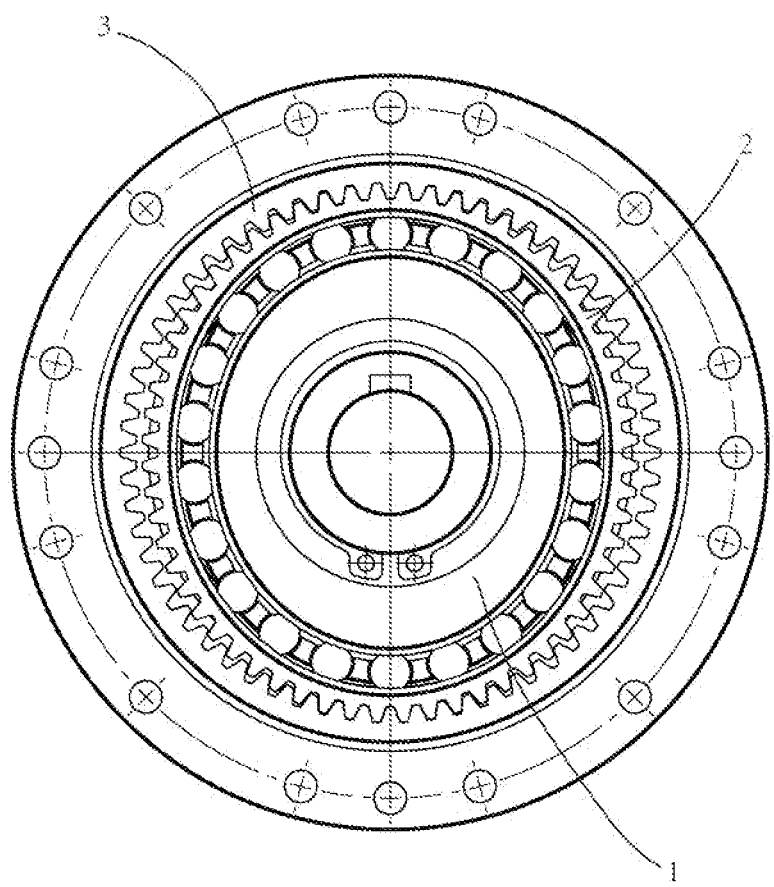
FIG. 1 is a front view of a double-flexspline harmonic reducer according to an embodiment 1.
Figure 2:
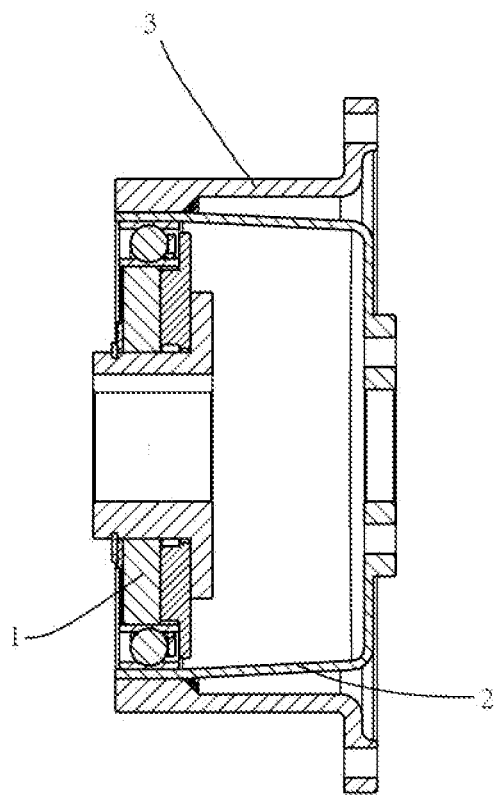
FIG. 2 is a sectional view of the double-flexspline harmonic reducer according to the embodiment 1.
Figure 3:
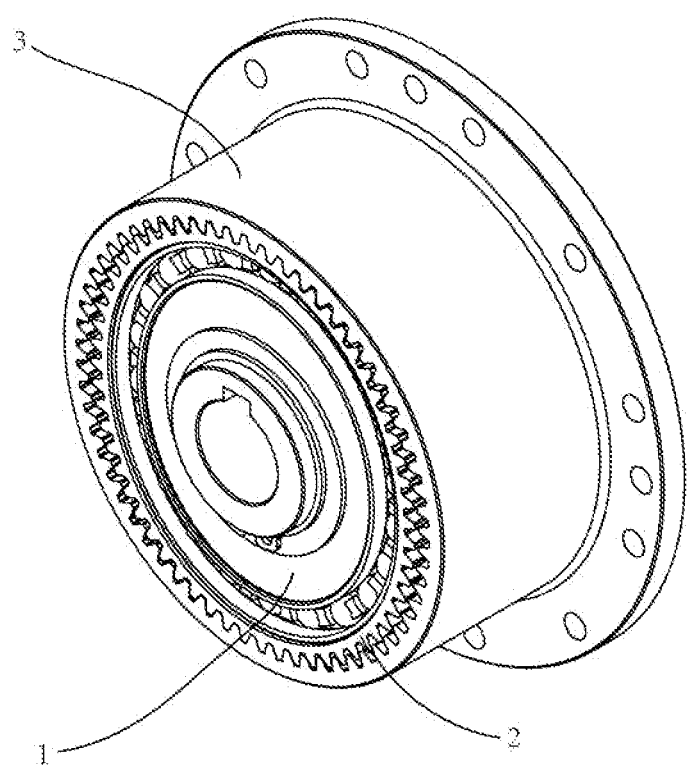
FIG. 3 is a perspective view of the double-flexspline harmonic reducer according to the embodiment 1.
Figure 4:
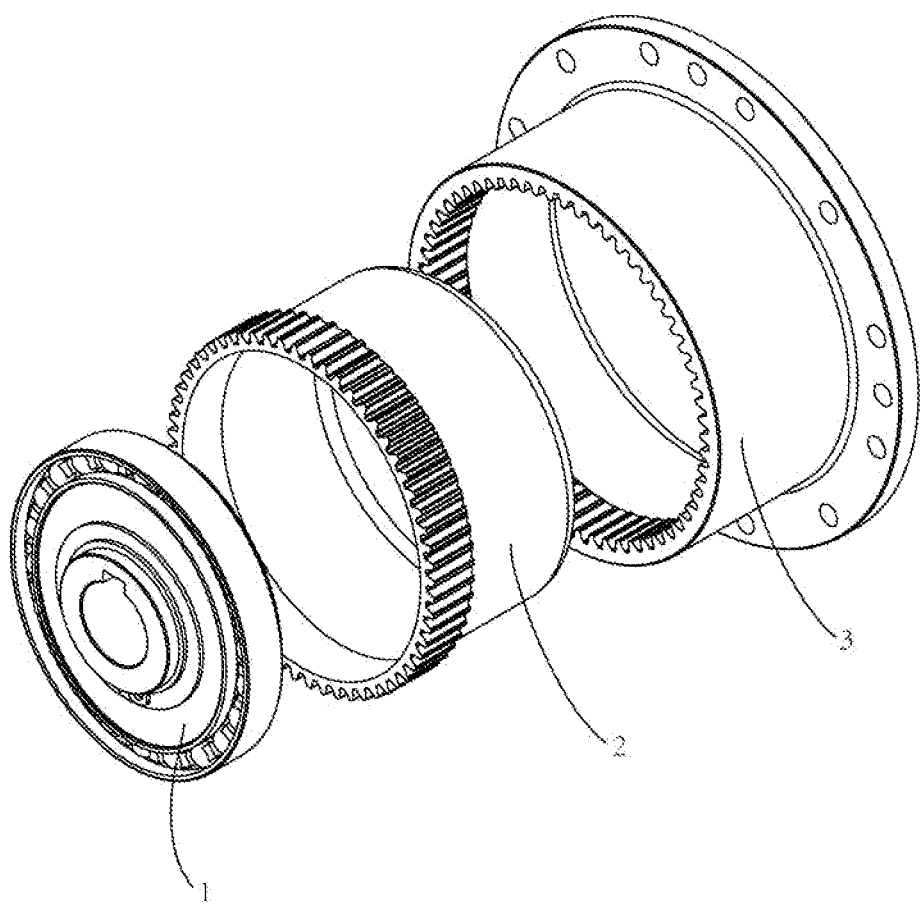
FIG. 4 is an exploded view of the double-flexspline harmonic reducer according to the embodiment 1.

Embodiment 1: As shown in FIGS. 1-4, a double-flexspline harmonic reducer is provided, including a strong flexspline, a weak flexspline and a wave generator. Both the strong flexspline and the weak flexspline are respectively provided with a mounting flange and machined from common steel materials of flexsplines of existing harmonic reducers by machining processes of the flexsplines. The strong flexspline is machined with internal teeth and the weak flexspline is machined with external teeth, and the internal and external teeth which are involute teeth can be engaged with each other. The weak flexspline is in the same thin-wall cup shape as flexsplines of most existing harmonic reducers, while the strong flexspline is in the shape of flexspline having an outward flanging and has two more teeth than those of the weak flexspline, and its wall thickness is 2.5 times that of the weak flexspline. The wave generator is a wave generator having a ball bearing provided outside an elliptical cam, which is commonly used in existing harmonic reducers. The wave generator is provided with a shaft hole of a keyway connected to an input torque, and is installed in the weak flexspline to cause the weak flexspline to undergo non-circular elastic deformation and then to partially engage with the strong flexspline. After elliptical elastic deformation of the weak flexspline under the action of the wave generator, the reference radius of teeth at both ends of an elliptical major axis is 0.1 mm greater than that of the teeth of the strong flexspline, and a contact portion of the strong flexspline and the weak flexspline undergoes non-circular elastic deformation under a radial pressure from the weak flexspline. Since the weak flexspline always keeps part of the teeth thereof continuously engaged in and out the teeth of the strong flexspline along a rotation direction of the wave generator, the strong flexspline and the weak flexspline will rotate relatively when driven by the rotation of the wave generator, to achieve a reducer effect of reducing speed and increasing torque. In this embodiment, the wave generator, the weak flexspline and the strong flexspline can be used only by being concentrically installed and fixed in an axial direction and a radial direction on the reducer through shaft holes or flanges. In the figures, the strong flexspline has a small amount of deformation, and it is not easy to visualize the amount of elliptical deformation of the strong flexspline with naked eyes, so the fact that the strong flexspline is deformed should be interpreted and understood according to the specification. The components such as the wave generator and bearings in the figures are multi-part components, and the reference numerals in the figures denote any parts contained in the referenced components. Some connecting bolts and gaskets are not shown in the exploded view.

Figure 5:
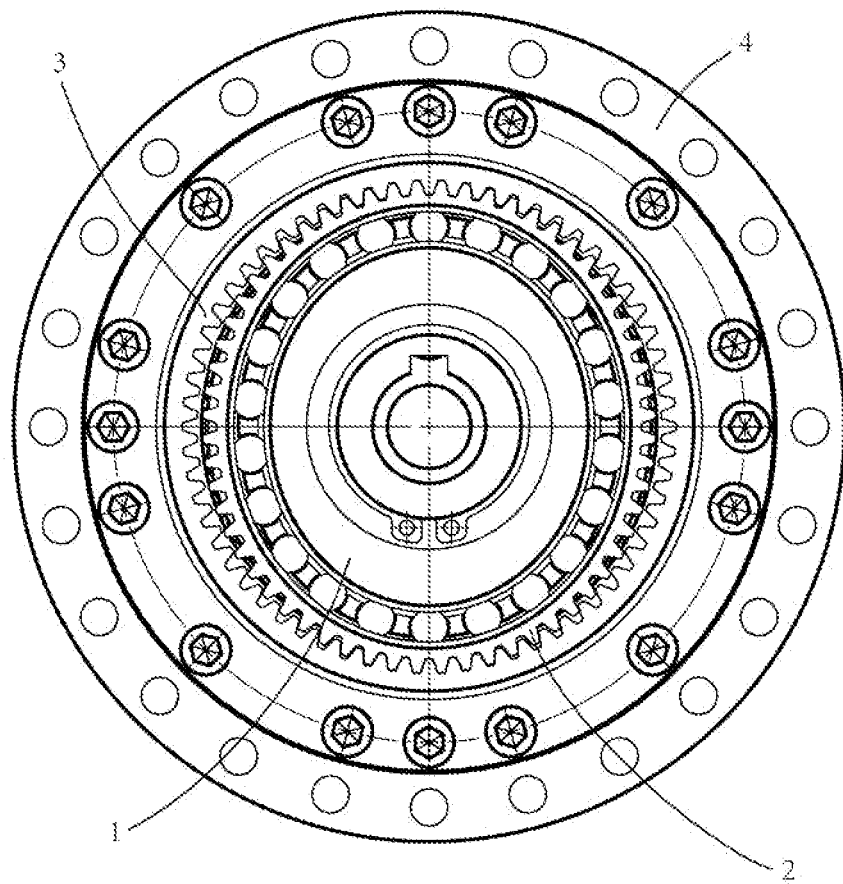
FIG. 5 is a front view of a double-flexspline harmonic reducer according to an embodiment 2.
Figure 6:
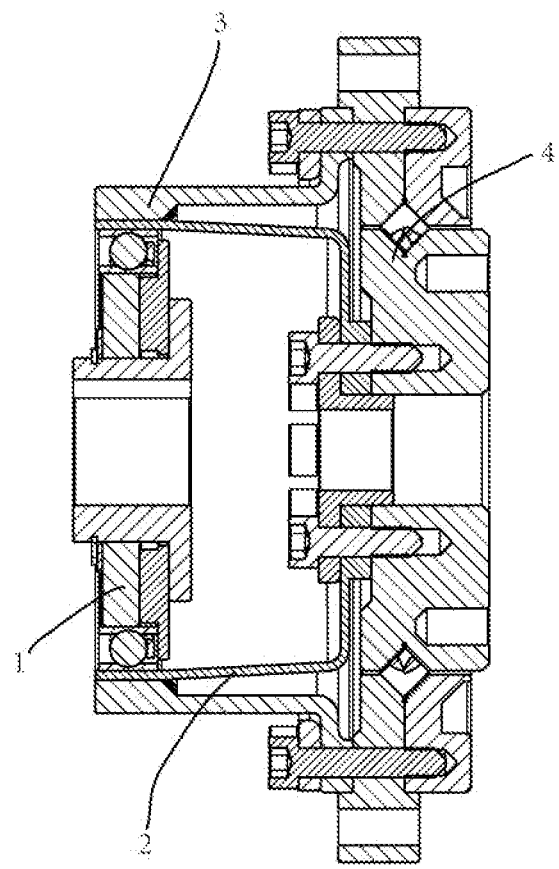
FIG. 6 is a sectional view of the double-flexspline harmonic reducer according to the embodiment 2.
Figure 7:
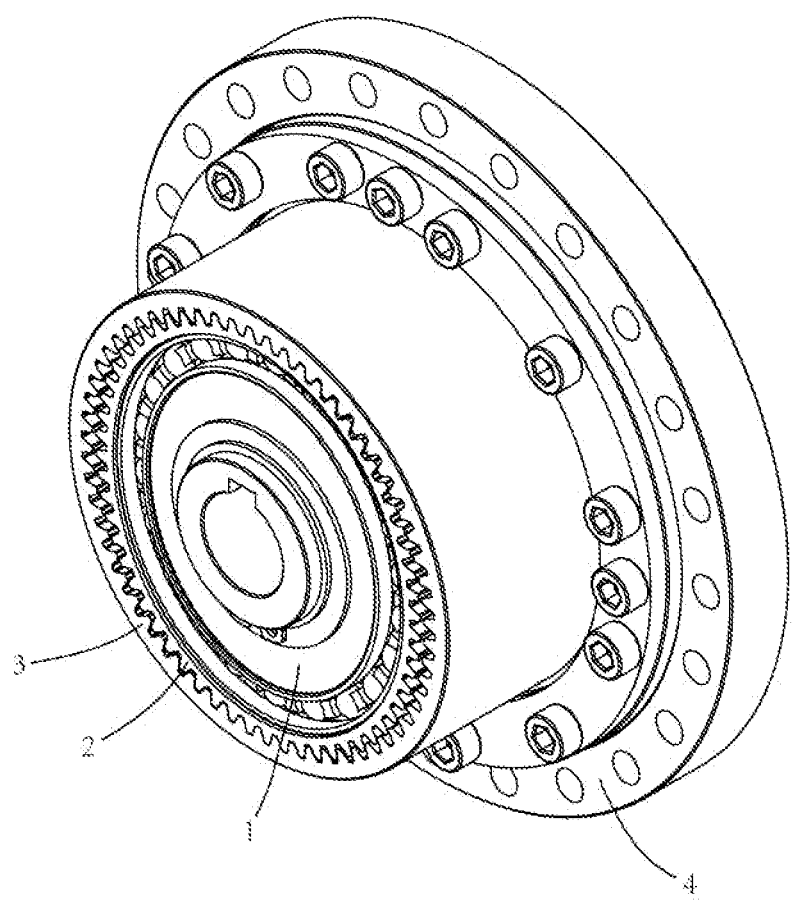
FIG. 7 is a perspective view of the double-flexspline harmonic reducer according to the embodiment 2.
Figure 8:
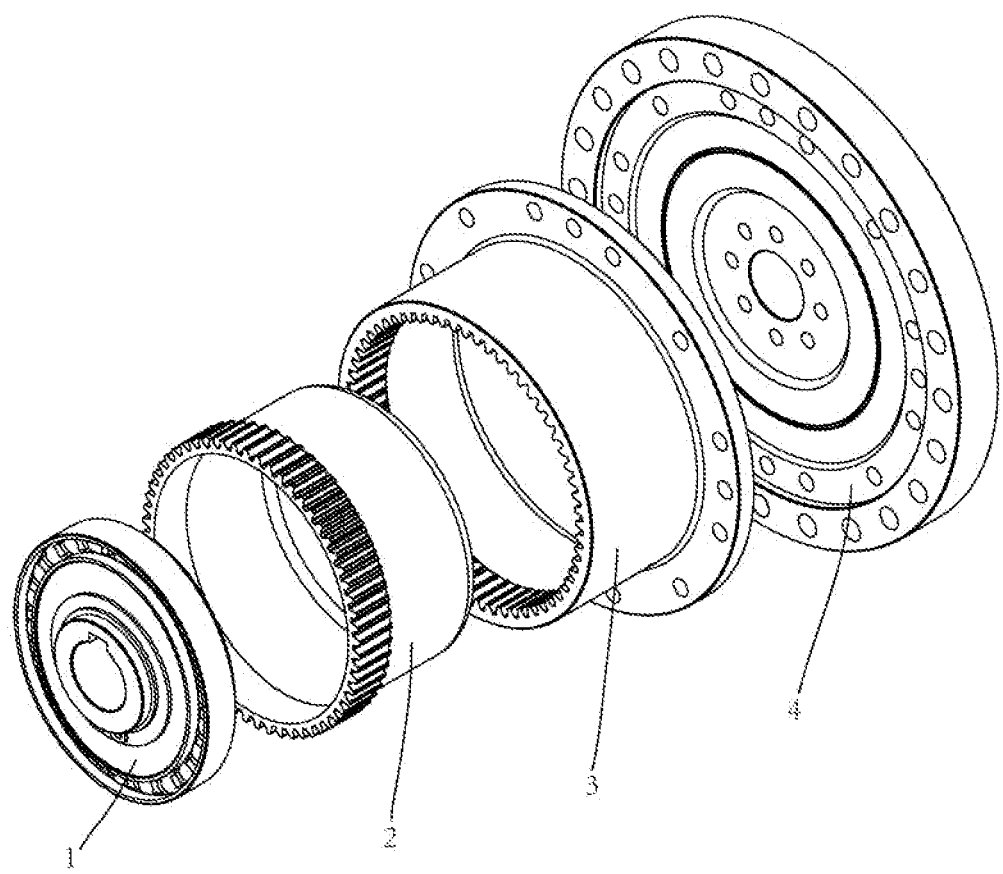
FIG. 8 is an exploded view of the double-flexspline harmonic reducer according to the embodiment 2.

Embodiment 2: As shown in FIGS. 5-8, a double-flexspline harmonic reducer is provided, including a strong flexspline, a weak flexspline, a wave generator and a reducer main bearing. The reducer main bearing is a crossed roller bearing, and both the strong flexspline and the weak flexspline are respectively provided with a mounting flange through which the strong flexspline and the weak flexspline are fixed to an outer race and an inner race of the reducer main bearing by bolts. The strong flexspline and the weak flexspline are both machined from common steel materials of flexsplines of existing harmonic reducers by machining processes of the flexsplines. The strong flexspline is machined with internal teeth and the weak flexspline is machined with external teeth, and the internal and external teeth which are involute teeth can be engaged with each other. The weak flexspline is in the same thin-wall cup shape as flexsplines of most existing harmonic reducers, while the strong flexspline is in the shape of flexspline having an outward flanging and has two more teeth than those of the weak flexspline, and its wall thickness is 2.5 times that of the weak flexspline. The wave generator is a wave generator having a ball bearing provided outside an elliptical cam, which is commonly used in existing harmonic reducers. The wave generator is provided with a shaft hole of a keyway connected to an input torque, and is installed in the weak flexspline to cause the weak flexspline to undergo non-circular elastic deformation and then to partially engage with the strong flexspline. After elliptical elastic deformation of the weak flexspline under the action of the wave generator, the reference radius of teeth at both ends of an elliptical major axis is 0.1 mm greater than that of the teeth of the strong flexspline, and a contact portion of the strong flexspline and the weak flexspline undergoes non-circular elastic deformation under a radial pressure from the weak flexspline. Since the weak flexspline always keeps part of the teeth thereof continuously engaged in and out the teeth of the strong flexspline along a rotation direction of the wave generator, the strong flexspline and the weak flexspline will rotate relatively when driven by the rotation of the wave generator, to achieve a reducer effect of reducing speed and increasing torque. In the figures, the strong flexspline has a small amount of deformation, and it is not easy to visualize the amount of elliptical deformation of the strong flexspline with naked eyes, so the fact that the strong flexspline is deformed should be interpreted and understood according to the specification. The components such as the wave generator and bearings in the figures are multi-body components, and the reference numerals in the figures denote any bodies contained in the referenced components. Some connecting bolts and gaskets are not shown in the exploded view.

Figure 9:
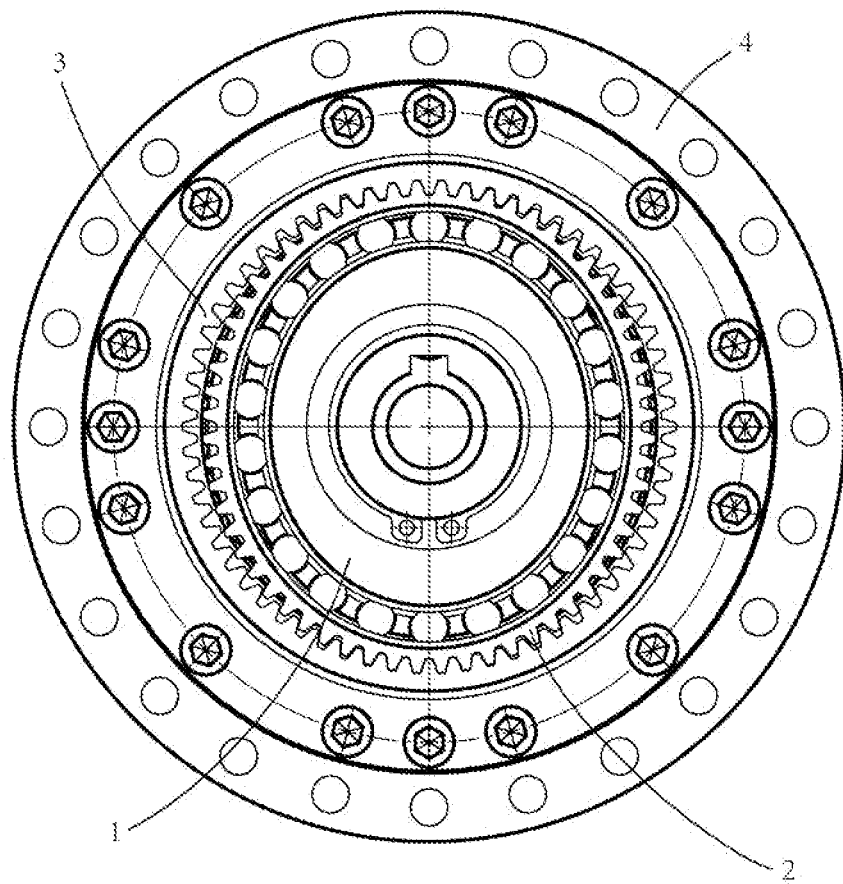
FIG. 9 is a front view of a double-flexspline harmonic reducer according to an embodiment 3.
Figure 10:
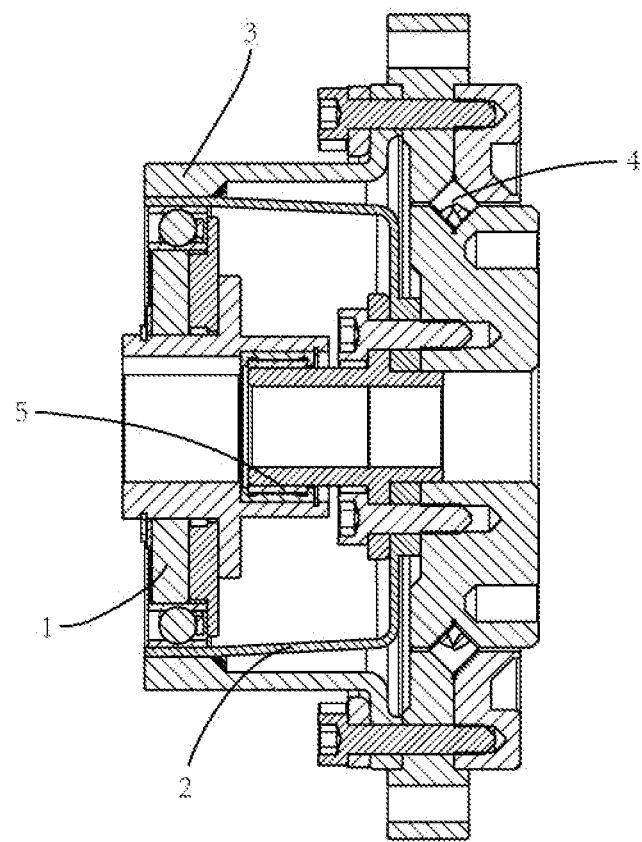
FIG. 10 is a sectional view of the double-flexspline harmonic reducer according to the embodiment 3.
Figure 11:
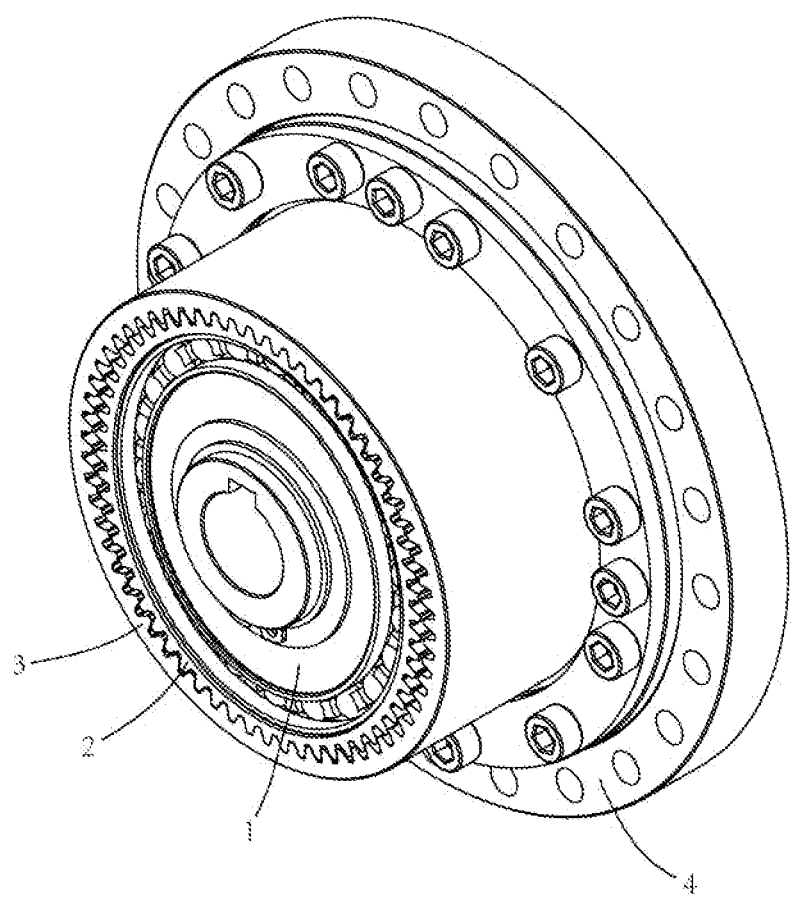
FIG. 11 is a perspective view of the double-flexspline harmonic reducer according to the embodiment 3.
Figure 12:
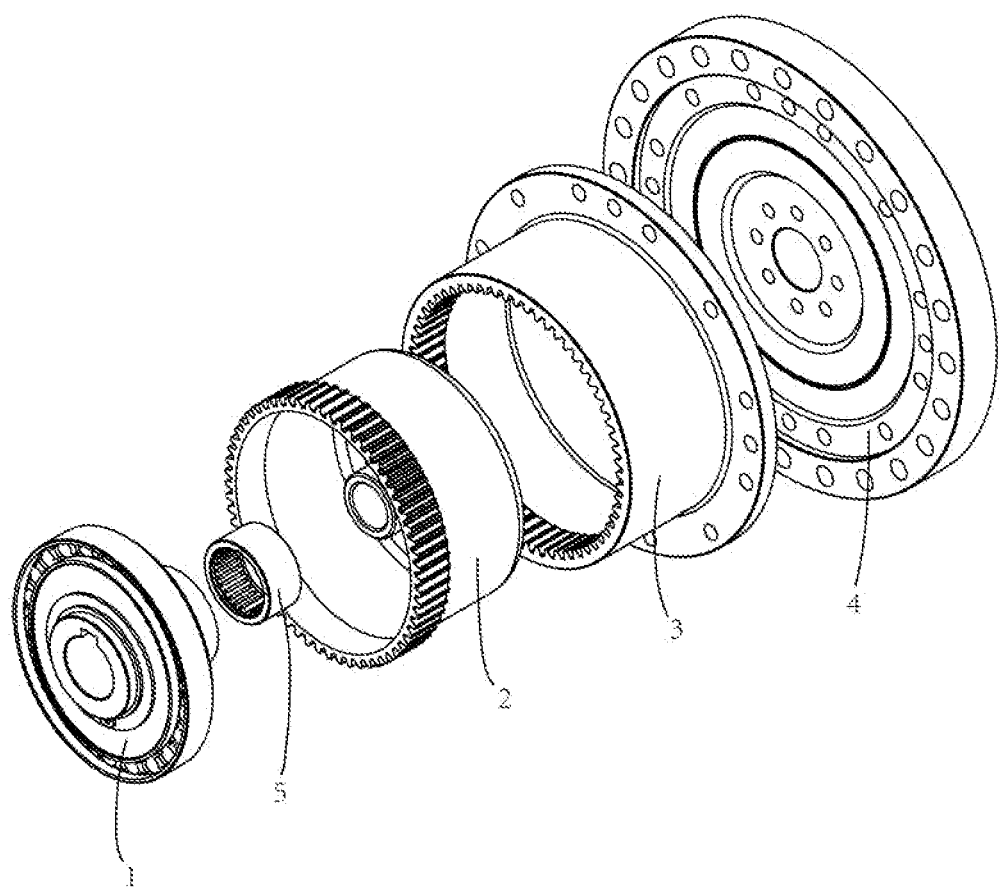
FIG. 12 is an exploded view of the double-flexspline harmonic reducer according to the embodiment 3.

Embodiment 3: As shown in FIGS. 9-12, a double-flexspline harmonic reducer is provided, including a strong flexspline, a weak flexspline, a wave generator, a reducer main bearing and a wave generator locating bearing. The reducer main bearing is a crossed roller bearing, and both the strong flexspline and the weak flexspline are respectively provided with a mounting flange through which the strong flexspline and the weak flexspline are fixed to an outer race and an inner race of the reducer main bearing by bolts. The strong flexspline and the weak flexspline are both machined from common steel materials of flexsplines of the existing harmonic reducers by machining processes of the flexsplines. The strong flexspline is machined with internal teeth and the weak flexspline is machined with external teeth, and the internal and external teeth which are involute teeth can be engaged with each other. The weak flexspline is in the same thin-wall cup shape as flexsplines of most existing harmonic reducers, while the strong flexspline is in the shape of flexspline having an outward flanging and has two more teeth than those of the weak flexspline, and its wall thickness is 2.5 times that of the weak flexspline. The wave generator is a wave generator having a ball bearing provided outside an elliptical cam, which is commonly used in existing harmonic reducers. The wave generator is provided with a shaft hole of a keyway connected to an input torque, and is installed in the weak flexspline to cause the weak flexspline to undergo non-circular elastic deformation and then to partially engage with the strong flexspline. After elliptical elastic deformation of the weak flexspline under the action of the wave generator, the reference radius of teeth at both ends of an elliptical major axis is 0.2 mm greater than that of the teeth of the strong flexspline. The wave generator locating gear is a needle roller bearing, and the outer race of the bearing is coaxially and radially fixed to the wave generator. Hollow shafts are provided at both ends of a gasket of the weak flexspline, where the hollow shaft at one end is coaxially and radially fixed to the inner race of the bearing, and the hollow shaft at the other end is inserted into the wave generator locating bearing and coaxially and radially fixed to the wave generator, so that the wave generator and an axis of the reducer are coaxially fixed even better, and a contact portion of the strong flexspline and the weak flexspline undergoes non-circular elastic deformation under a radial pressure from the weak flexspline. Since the weak flexspline always keeps part of the teeth thereof continuously engaged in and out the teeth of the strong flexspline along a rotation direction of the wave generator, the strong flexspline and the weak flexspline will rotate relatively when driven by the rotation of the wave generator, to achieve a reducer effect of reducing speed and increasing torque. In the figures, the strong flexspline has a small amount of deformation, and it is not easy to visualize the amount of elliptical deformation of the strong flexspline with naked eyes, so the fact that the strong flexspline is deformed should be interpreted and understood according to the specification. The components such as the wave generator and bearings in the figures are multi-body components, and the reference numerals in the figures denote any bodies contained in the referenced components. Some connecting bolts and gaskets are not shown in the exploded view.

Figure 13:
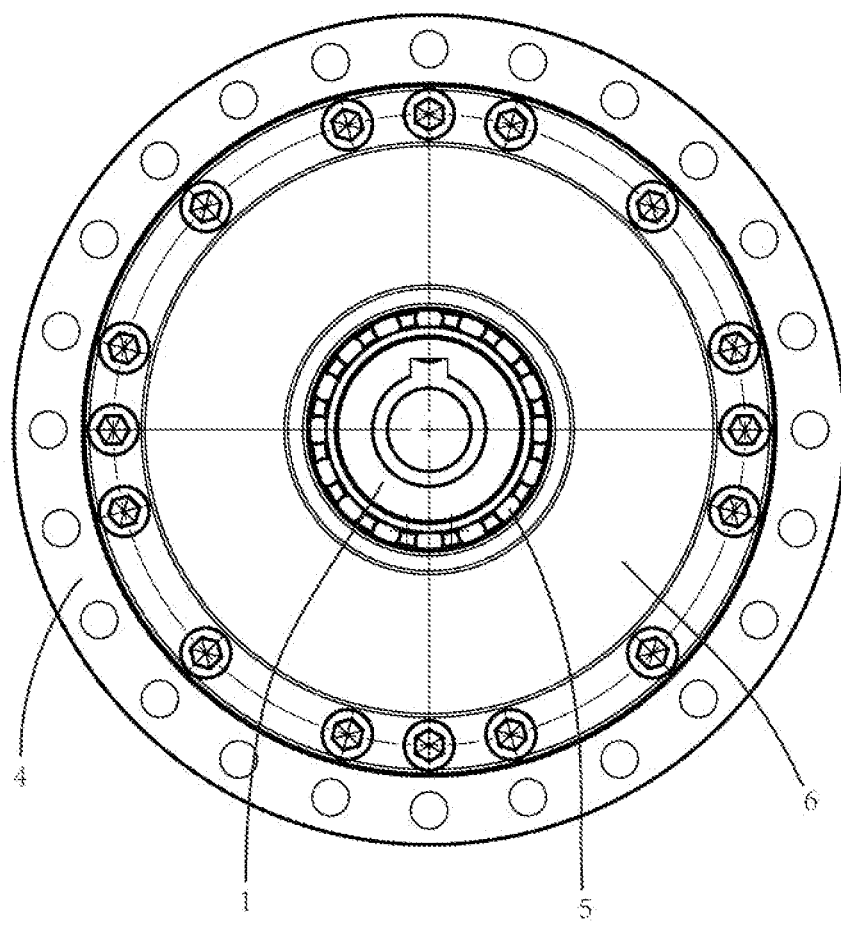
FIG. 13 is a front view of a double-flexspline harmonic reducer according to an embodiment 4.
Figure 14:
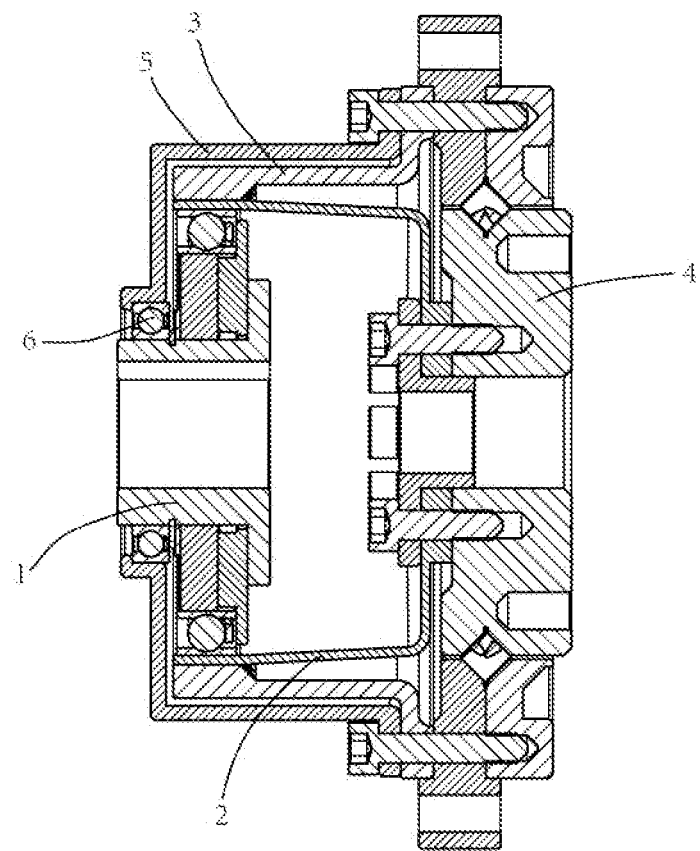
FIG. 14 is a sectional view of the double-flexspline harmonic reducer according to the embodiment 4.
Figure 15:
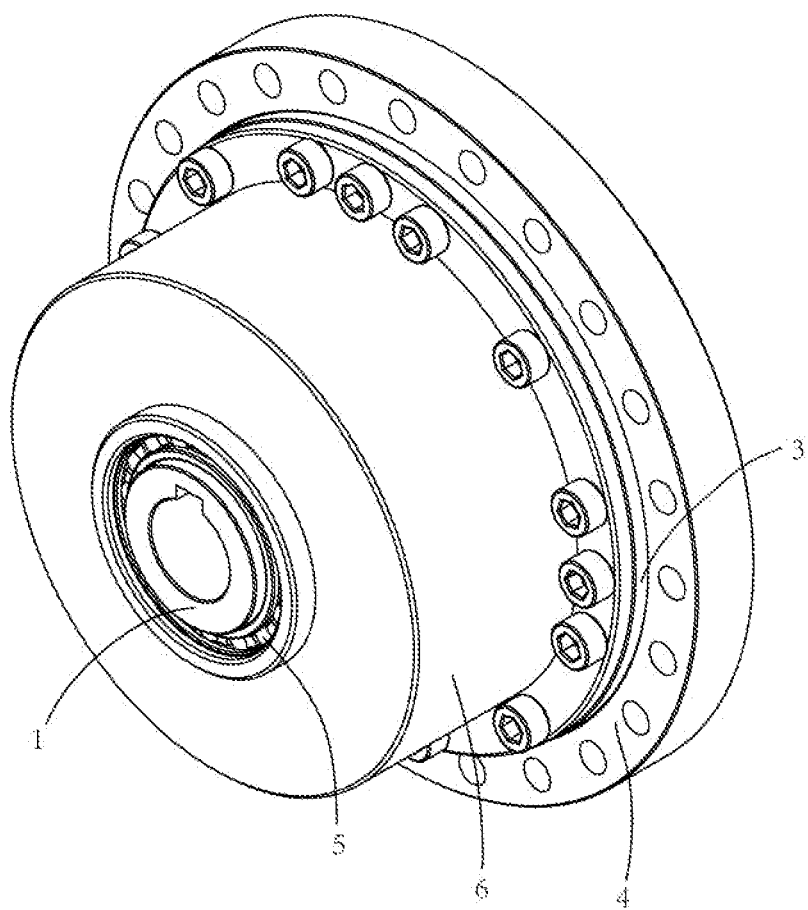
FIG. 15 is a perspective view of the double-flexspline harmonic reducer according to the embodiment 4.
Figure 16:
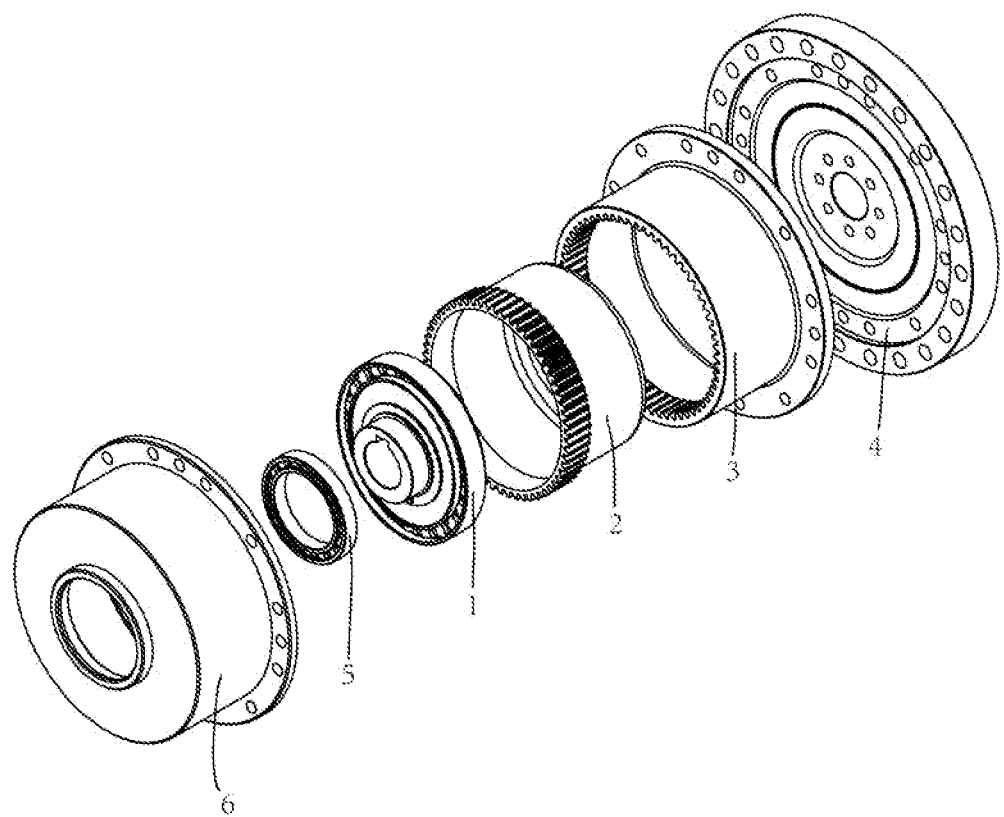
FIG. 16 is an exploded view of the double-flexspline harmonic reducer according to the embodiment 4.

Embodiment 4: As shown in FIGS. 13-16, a double-flexspline harmonic reducer is provided, including a strong flexspline, a weak flexspline, a wave generator, a reducer main bearing, a wave generator locating bearing and a flexspline protective casing. The reducer main bearing is a crossed roller bearing, both the strong flexspline and the weak flexspline are respectively provided with a mounting flange through which the strong flexspline and the weak flexspline are fixed to an inner race of the reducer main bearing by bolts and gaskets, and the flexspline protective casing is a casing machined from metal and provided with a flange. The strong flexspline and the weak flexspline are both machined from common steel materials of flexsplines of the existing harmonic reducers by machining processes of the flexsplines. The strong flexspline is provided with internal teeth and the weak flexspline is provided with external teeth, and the internal and external teeth which are involute teeth can be engaged with each other. The weak flexspline is in the same thin-wall cup shape as most existing harmonic flexspline reducers, while the strong flexspline is in the shape of flexspline having an outward flanging and has two more teeth than those of the weak flexspline, and its wall thickness is 2 times that of the weak flexspline. The wave generator is a wave generator having a ball bearing provided outside an elliptical cam, which is commonly used in existing harmonic reducers. The wave generator is provided with a shaft hole of a keyway connected to an input torque, and is installed in the weak flexspline to cause the weak flexspline to undergo non-circular elastic deformation and then to partially engage with the strong flexspline. After elliptical elastic deformation of the weak flexspline under the action of the wave generator, the reference radius of teeth at both ends of an elliptical major axis is 0.3 mm greater than that of the teeth of the strong flexspline. The wave generator locating bearing is a deep groove ball bearing, an outer race of the wave generator locating bearing is embedded in a groove in the center of the bottom of the flexspline protective casing while an inner race thereof is sleeved on and fixed to a camshaft of the wave generator, and a contact portion of the strong flexspline and the weak flexspline undergoes non-circular elastic deformation under a radial pressure from the weak flexspline. Since the weak flexspline always keeps part of the teeth thereof continuously engaged in and out the teeth of the strong flexspline along a rotation direction of the wave generator, the strong flexspline and the weak flexspline will rotate relatively when driven by the rotation of the wave generator, to achieve a reducer effect of reducing speed and increasing torque. In the figures, the strong flexspline has a small amount of deformation, and it is not easy to visualize the amount of elliptical deformation of the strong flexspline with naked eyes, so the fact that the strong flexspline is deformed should be interpreted and understood according to the specification. The components such as the wave generator and bearings in the figures are multi-body components, and the reference numerals in the figures denote any bodies contained in the referenced components. Some connecting bolts and gaskets are not shown in the exploded view.

Figure 17:
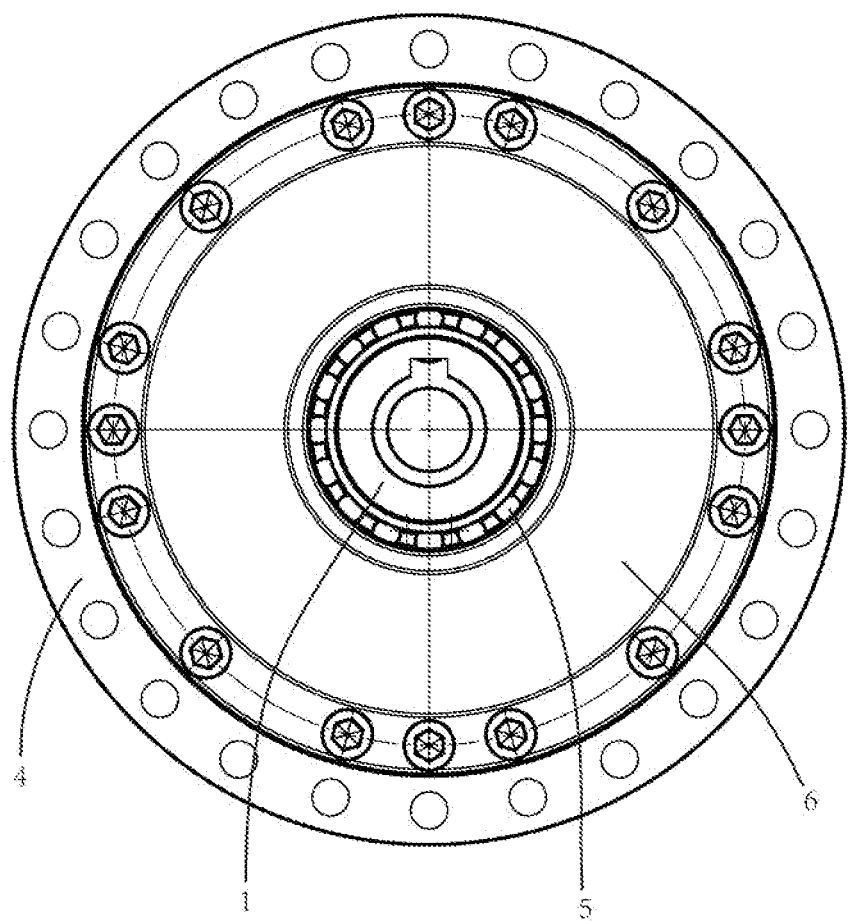
FIG. 17 is a front view of a double-flexspline harmonic reducer according to an embodiment 5.
Figure 18:
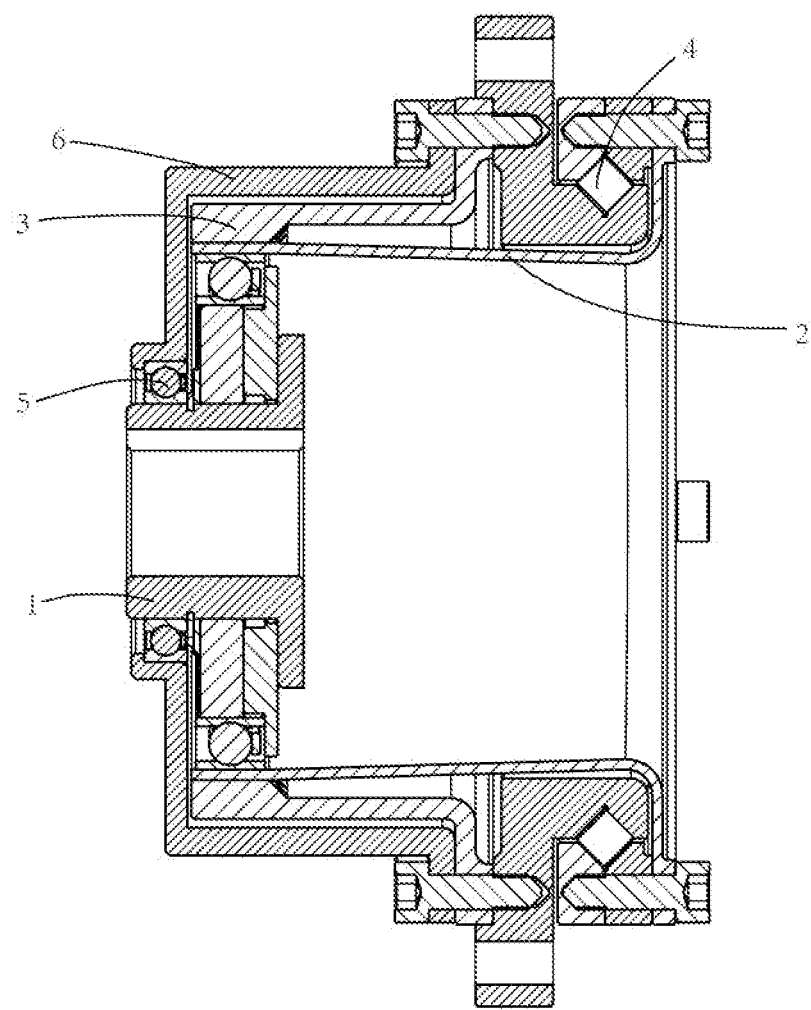
FIG. 18 is a sectional view of the double-flexspline harmonic reducer according to the embodiment 5.
Figure 19:
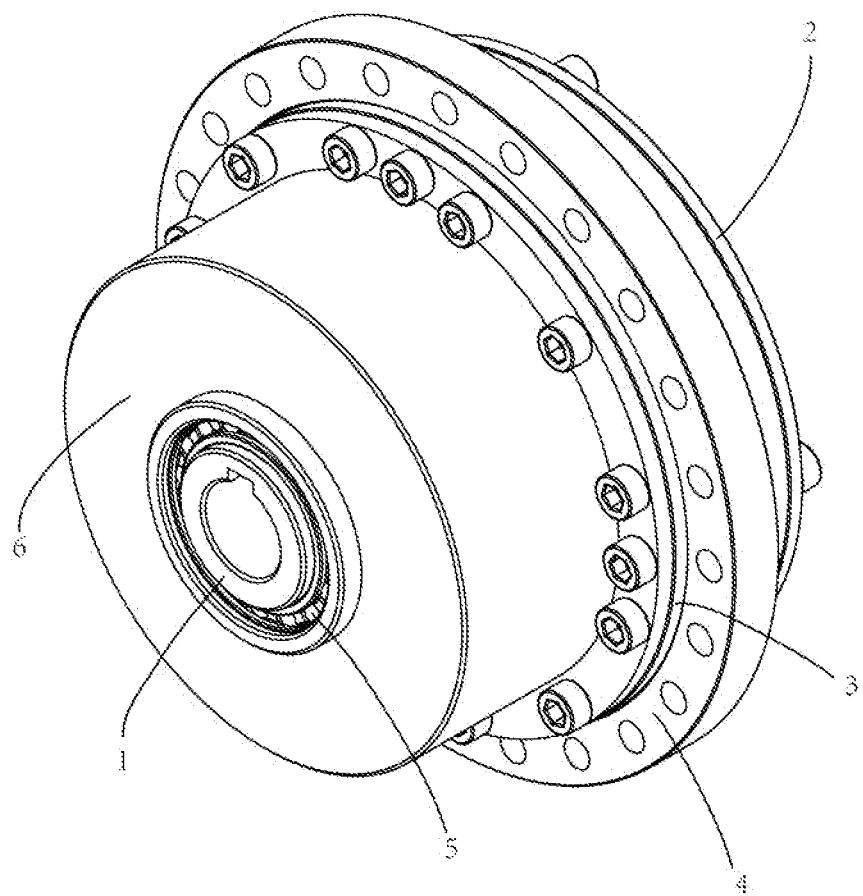
FIG. 19 is a perspective view of the double-flexspline harmonic reducer according to the embodiment 5.
Figure 20:
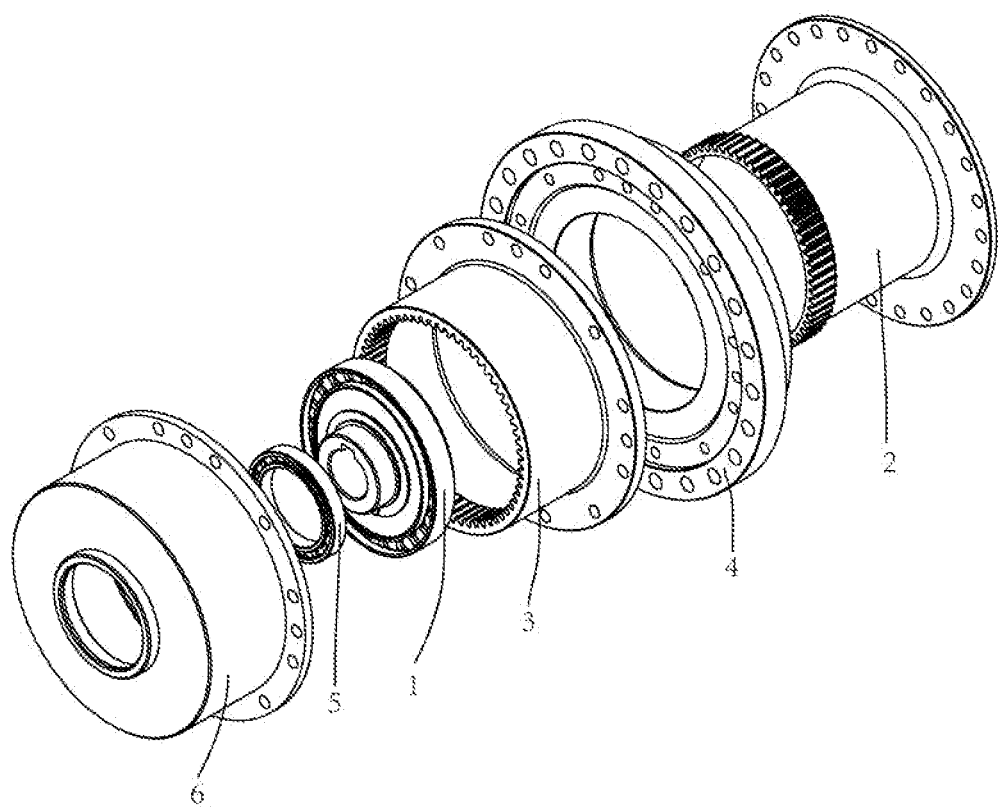
FIG. 20 is an exploded view of the double-flexspline harmonic reducer according to the embodiment 5.

Embodiment 5: As shown in FIGS. 17-20, a double-flexspline harmonic reducer is provided, including a strong flexspline, a weak flexspline, a wave generator, a reducer main bearing, a wave generator locating bearing and a flexspline protective casing. The reducer main bearing is a crossed roller bearing, both the strong flexspline and the weak flexspline are respectively provided with a mounting flange through which the strong flexspline and the weak flexspline are fixed to an outer race of the reducer main bearing by bolts, and the flexspline protective casing is a casing machined from metal and provided with a flange. The strong flexspline and the weak flexspline are both machined from common steel materials of a flexspline of the existing harmonic reducers by machining processes of the flexspline. The strong flexspline is provided with internal teeth and the weak flexspline is provided with external teeth, and the internal and external teeth which are involute teeth can be engaged with each other. The weak flexspline is of a thin-wall tubular structure having an outward flanging, while the strong flexspline is in a thin-wall tubular shape having an outward flanging and has two more teeth than those of the weak flexspline, and its wall thickness is 2 times that of the weak flexspline. The wave generator is a wave generator having a ball bearing provided outside an elliptical cam, which is commonly used in existing harmonic reducers. The wave generator is provided with a shaft hole of a keyway connected to an input torque, and is installed in the weak flexspline to cause the weak flexspline to undergo non-circular elastic deformation and then to partially engage with the strong flexspline. After elliptical elastic deformation of the weak flexspline under the action of the wave generator, the reference radius of teeth at both ends of an elliptical major axis is 0.3 mm greater than that of the teeth of the strong flexspline. The wave generator locating bearing is a deep groove ball bearing, an outer race of the wave generator locating bearing is embedded in a groove in the center of the bottom of the flexspline protective casing while an inner race thereof is sleeved on and fixed to a camshaft of the wave generator, and a contact portion of the strong flexspline and the weak flexspline undergoes non-circular elastic deformation under a radial pressure from the weak flexspline. Since the weak flexspline always keeps part of the teeth thereof continuously engaged in and out the teeth of the strong flexspline along a rotation direction of the wave generator, the strong flexspline and the weak flexspline will rotate relatively when driven by the rotation of the wave generator, to achieve a reducer effect of reducing speed and increasing torque. In the figures, the strong flexspline has a small amount of deformation, and it is not easy to visualize the amount of elliptical deformation of the strong flexspline with naked eyes, so the fact that the strong flexspline is deformed should be interpreted and understood according to the specification. The components such as the wave generator and bearings in the figures are multi-body components, and the reference numerals in the figures denote any bodies contained in the referenced components. Some connecting bolts and gaskets are not shown in the exploded view.

Figure 21:
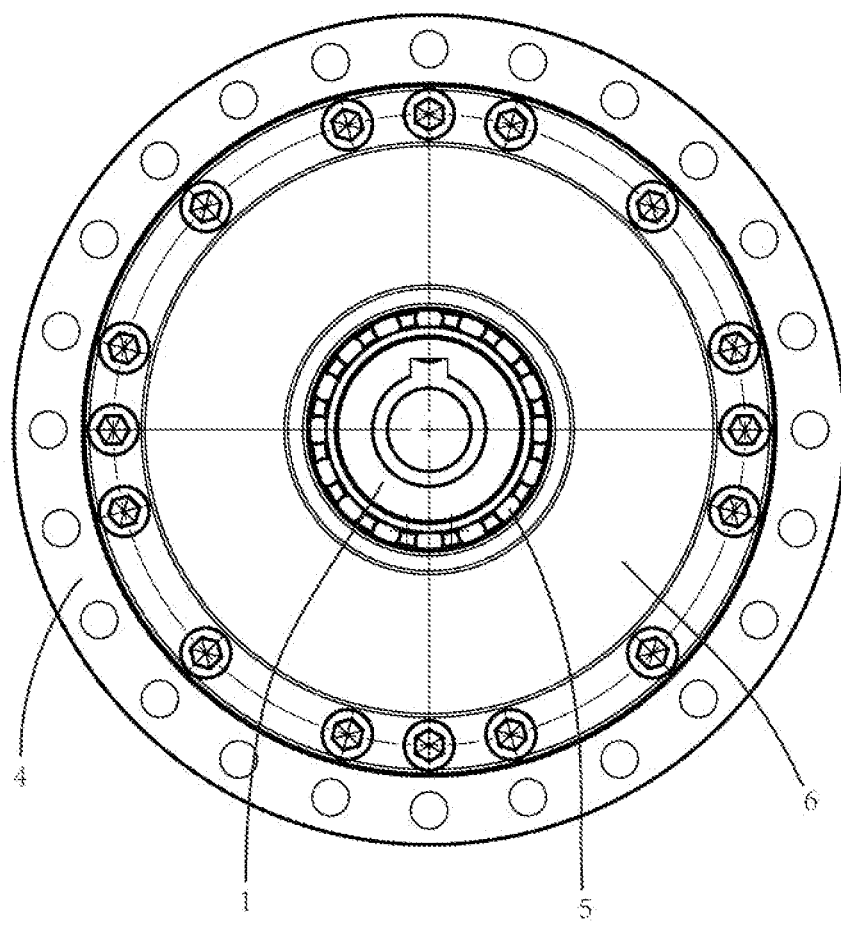
FIG. 21 is a front view of a double-flexspline harmonic reducer according to an embodiment 6.
Figure 22:
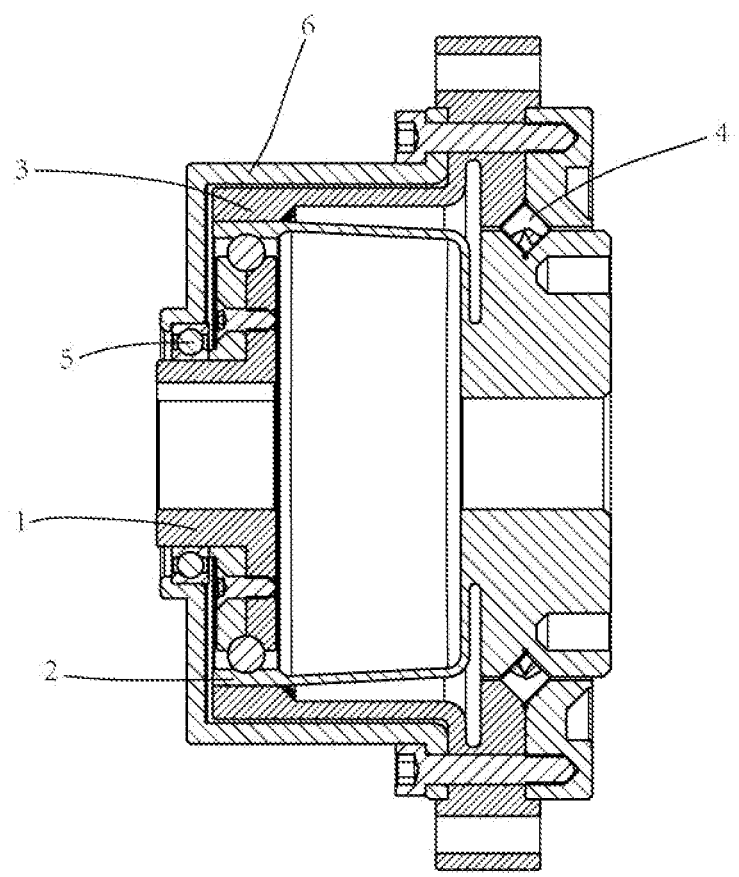
FIG. 22 is a sectional view of the double-flexspline harmonic reducer according to the embodiment 6.
Figure 23:
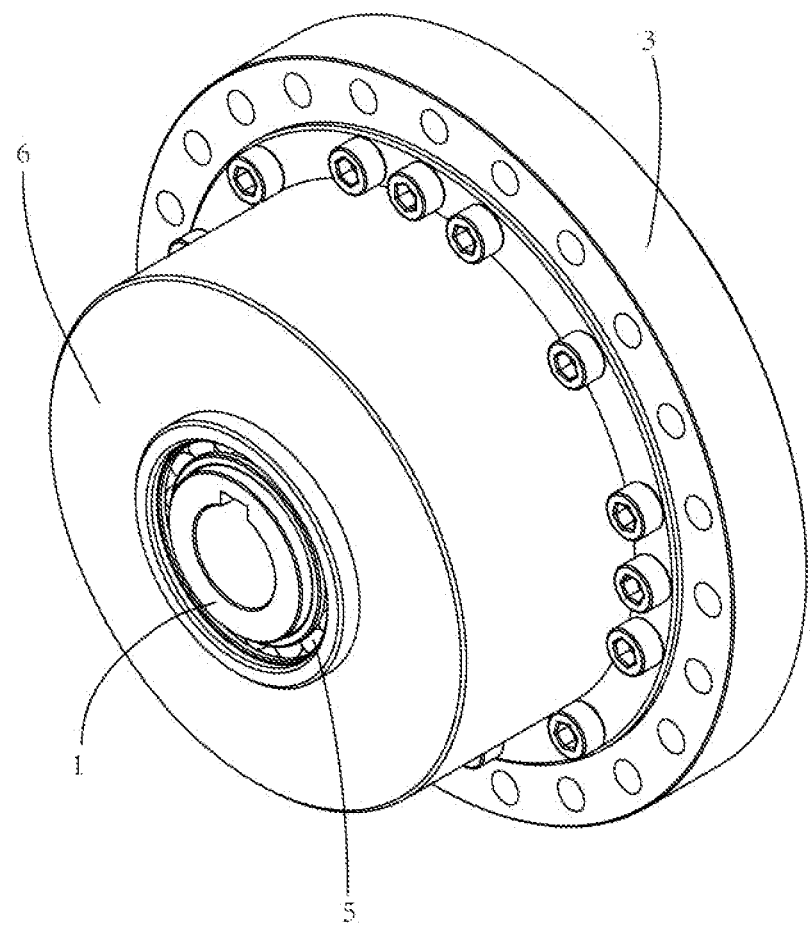
FIG. 23 is a perspective view of the double-flexspline harmonic reducer according to the embodiment 6.
Figure 24:
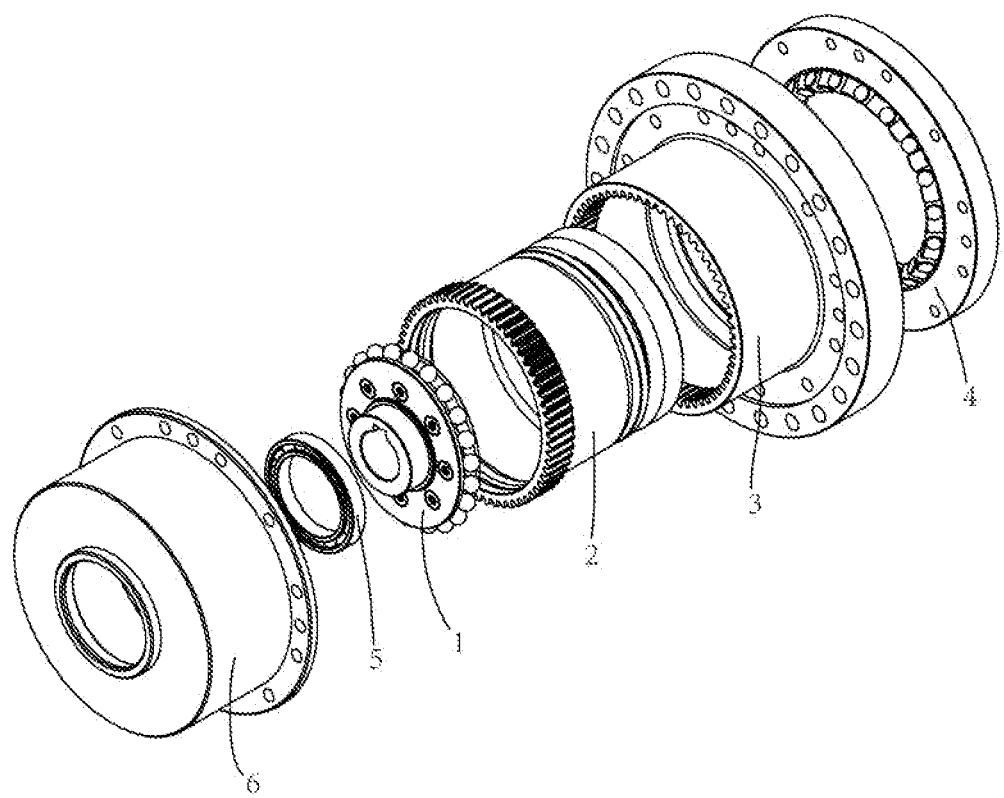
FIG. 24 is an exploded view of the double-flexspline harmonic reducer according to the embodiment 6.

Embodiment 6: As shown in FIGS. 21-24, a double-flexspline harmonic reducer is provided, including a strong flexspline, a weak flexspline, a wave generator, a reducer main bearing, a wave generator locating bearing and a flexspline protective casing. The reducer main bearing is of a crossed roller bearing structure, and the strong flexspline, the weak flexspline, an inner race and an outer race of the reducer main bearing, the flexspline protective casing and an elliptical cam of the wave generator are all made of PA610 material through injection molding, and grooves are machined by a lathe at positions that are not easy to demold, wherein the weak flexspline and the inner race of the reducer main bearing are machined on one part, while the strong flexspline and the outer race of the reducer main bearing are machined on one part. At the same time, after rollers are filled between the weak flexspline and the strong flexspline, the other part of the outer race of the reducer main bearing is connected and fixed to part of the reducer main bearing on the strong flexspline by bolts. The strong flexspline is provided with internal teeth and the weak flexspline is provided with external teeth, and the internal and external teeth which are involute teeth can be engaged with each other. The weak flexspline is of a structure having an inward flanging, while the strong flexspline is of a structure having an outward flanging and has two more teeth than those of the weak flexspline, and its wall thickness is 2 times that of the weak flexspline. The wave generator is of a commonly used structure in which a ball groove is provided outside an elliptical cam. During machining of the weak flexspline, the ball groove is machined on an inner side of an tooth ring, balls are filled in a ball groove of the wave generator and a ball groove on an inner side of the tooth ring of the weak flexspline, and upper and lower portions of the wave generator are tightened and fixed by bolts. The wave generator is provided with a shaft hole of a keyway connected to an input torque, and is installed in the weak flexspline to cause the weak flexspline to undergo non-circular elastic deformation and then to partially engage with the strong flexspline. After elliptical elastic deformation of the weak flexspline under the action of the wave generator, the reference radius of teeth at both ends of an elliptical major axis is 0.6 mm greater than that of the teeth of the strong flexspline. The wave generator locating bearing is a deep groove ball bearing, an outer race of the wave generator locating bearing is embedded in a groove in the center of the bottom of the flexspline protective casing while an inner race thereof is sleeved on and fixed to a camshaft of the wave generator, and a contact portion of the strong flexspline and the weak flexspline undergoes non-circular elastic deformation under a radial pressure from the weak flexspline. Since the weak flexspline always keeps part of the teeth thereof continuously engaged in and out the teeth of the strong flexspline along a rotation direction of the wave generator, the strong flexspline and the weak flexspline will rotate relatively when driven by the rotation of the wave generator, to achieve a reducer effect of reducing speed and increasing torque. In the figures, the strong flexspline has a small amount of deformation, and it is not easy to visualize the amount of elliptical deformation of the strong flexspline with naked eyes, so the fact that the strong flexspline is deformed should be interpreted and understood according to the specification. The components such as the wave generator and bearings in the figures are multi-body components, and the reference numerals in the figures denote any bodies contained in the referenced components. Some connecting bolts and gaskets are not shown in the exploded view. In this embodiment, the inner race of the main bearing and the weak flexspline are integrally machined into one part, and part of the outer race of the main bearing and the strong flexspline are integrally machined into one part, so the reference numeral of the main bearing in the figures of this embodiment denotes the remaining part of the outer race and a bearing roller. Similarly, a non-circular bearing of the wave generator is of a structure without any separate outer race, and a ball rolling groove on the outer race is directly machined on the flexsplines, respectively, so the wave generator in the exploded view is in a state without an outer race bearing.

What is claimed is:

1. A double-flexspline harmonic reducer, comprising a strong flexspline, a weak flexspline and a wave generator, wherein the strong flexspline and the weak flexspline are coaxially fixed in an axial direction and a radial direction, and teeth which can be engaged with each other and are different in the number thereof are provided on the strong flexspline and the weak flexspline respectively; the wave generator causes the weak flexspline to undergo non-circular elastic deformation and then to partially engage with the strong flexspline, and a contact portion of the strong flexspline and the weak flexspline undergoes non-circular elastic deformation under a radial pressure from the weak flexspline; and a wall thickness of the strong flexspline is greater than or equal to 2 times and less than 5 times that of the weak flexspline, wherein a reference radius of the tooth farthest from an axis of the reducer after non-circular deformation of the weak flexspline under an action of the wave generator is greater than that of a circular tooth ring before an assembly of the strong flexspline.

2. The double-flexspline harmonic reducer according to claim 1, wherein the strong flexspline comprises a thin-wall structure which can elastically deform between a tooth ring structure and a connecting flange structure.

3. The double-flexspline harmonic reducer according to claim 1, wherein the double-flexspline harmonic reducer further comprises a reducer main bearing through which the strong flexspline and the weak flexspline are coaxially fixed in the axial direction and the radial direction.

4. The double-flexspline harmonic reducer according to claim 1, wherein the double-flexspline harmonic reducer further comprises a wave generator locating bearing through which the wave generator is fixed in the axial direction and the radial direction to the strong flexspline or the weak flexspline.

5. The double-flexspline harmonic reducer according to claim 1, wherein the reference radius of the tooth farthest from the axis of the reducer after non-circular deformation of the weak flexspline under the action of the wave generator is over 0.05 mm greater than that of the circular tooth ring before the assembly of the strong flexspline.

6. The double-flexspline harmonic reducer according to claim 1, wherein the reference radius of the tooth farthest from the axis of the reducer after non-circular deformation of the weak flexspline under the action of the wave generator is over 0.2 mm greater than that of the circular tooth ring before the assembly of the strong flexspline.

7. The double-flexspline harmonic reducer according to claim 1, wherein the reference radius of the tooth farthest from the axis of the reducer after non-circular deformation of the weak flexspline under the action of the wave generator is over 1 mm greater than that of the circular tooth ring before the assembly of the strong flexspline.

8. The double-flexspline harmonic reducer according to claim 1, wherein the strong flexspline is a tubular elastic part with an inward or outward flanging.

9. The double-flexspline harmonic reducer according to claim 1, wherein the weak flexspline is a thin-wall tubular elastic part with an inward or outward flanging.

10. The double-flexspline harmonic reducer according to claim 1, wherein the double-flexspline harmonic reducer further comprises an outer flexspline protective casing fixed to an inner race or an outer race of a reducer main bearing.

11. The double-flexspline harmonic reducer according to claim 1, wherein the strong flexspline or the weak flexspline of the double-flexspline harmonic reducer is made of a plastic material through injection molding, or made of the plastic material through injection molding and then minimally machined.

12. The double-flexspline harmonic reducer according to claim 11, wherein the weak flexspline and the strong flexspline of the double-flexspline harmonic reducer are directly molded through injection into parts including part of an inner race and an outer race of a main bearing, respectively.

13. The double-flexspline harmonic reducer according to claim 11, wherein a ball rolling groove of the wave generator is directly molded by machining on the strong flexspline of the double-flexspline harmonic reducer.

14. The double-flexspline harmonic reducer according to claim 1, wherein the teeth of the double-flexspline harmonic reducer is machined by laser engraving or etching.

15. A double-flexspline harmonic reducer, comprising a strong flexspline, a weak flexspline and a wave generator, wherein the strong flexspline and the weak flexspline are coaxially fixed in an axial direction and a radial direction, and teeth which can be engaged with each other and are different in the number thereof are provided on the strong flexspline and the weak flexspline respectively; the wave generator causes the weak flexspline to undergo non- circular elastic deformation and then to partially engage with the strong flexspline, and a contact portion of the strong flexspline and the weak flexspline undergoes non-circular elastic deformation under a radial pressure from the weak flexspline; and a wall thickness of the strong flexspline is greater than or equal to 2 times and less than 5 times that of the weak, wherein a reference radius of the circular toothring before an assembly of the strong flexspline is greater than that of the tooth closest to the axis of the reducer after non-circular deformation of the weak flexspline under an action of the wave generator.

\* \* \* \* \*